US010500953B2

(12) United States Patent
Yamamoto (10) Patent No.: US 10,500,953 B2
(45) Date of Patent: Dec. 10, 2019

(54) CONTROL APPARATUS OF VEHICLE

(71) Applicant: SUBARU CORPORATION, Tokyo (JP)

(72) Inventor: Takahiro Yamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 100 days.

(21) Appl. No.: 15/788,546

(22) Filed: Oct. 19, 2017

(65) Prior Publication Data

US 2018/0170177 A1   Jun. 21, 2018

(30) Foreign Application Priority Data

Dec. 20, 2016   (JP) .................................. 2016-247267

(51) Int. Cl.
*B60K 23/08*   (2006.01)
*B60K 17/344*   (2006.01)
(Continued)

(52) U.S. Cl.
CPC ........ *B60K 23/0808* (2013.01); *B60K 17/344* (2013.01); *B60K 17/35* (2013.01);
(Continued)

(58) Field of Classification Search
CPC .. B60K 23/0808; B60K 17/344; B60K 23/08; F16H 3/48; F16H 63/3425; B60Y 2300/18141; F16D 2500/10431
See application file for complete search history.

(56) References Cited

U.S. PATENT DOCUMENTS 6,411,880 B1 * 6/2002 McKee ............... F16H 61/0248
701/51
2002/0033293 A1 * 3/2002 Fukuda .............. B60K 23/0808
180/250
(Continued)

FOREIGN PATENT DOCUMENTS

JP   09-152031 A   6/1997
JP   2005-083492 A   3/2005
(Continued)

OTHER PUBLICATIONS

Japanese Office Action, dated Nov. 6, 2018, in Japanese Application No. 2016-247267 and English translation thereof.
(Continued)

*Primary Examiner* — Stacey A Fluhart
(74) *Attorney, Agent, or Firm* — McGinn I.P. Law Group, PLLC.

(57) ABSTRACT

A control apparatus of an all-wheel drive vehicle includes a vehicle speed detector, a first clutch, a second clutch, and a clutch controller. The vehicle speed detector detects a speed of the all-wheel drive vehicle. The first clutch is provided between a parking mechanism and a drive force source of the all-wheel drive vehicle, and adjusts first drive force to be transmitted from the drive force source to an output shaft of an automatic transmission of the all-wheel drive vehicle. The second clutch is provided between the parking mechanism and a drive wheel of the all-wheel drive vehicle, and adjusts second drive force to be transmitted from the output shaft to the drive wheel. The clutch controller controls engagement force of the first and second clutches, and disengages the first and second clutches when the speed of the all-wheel drive vehicle is equal to or less than a predetermined speed.

20 Claims, 3 Drawing Sheets

(51) Int. Cl.
    *F16D 48/06*     (2006.01)
    *B60K 17/35*     (2006.01)
    *F16H 63/48*     (2006.01)
    *F16H 3/66*     (2006.01)
    *F16H 9/18*     (2006.01)
    *F16H 37/06*     (2006.01)
    *F16H 63/34*     (2006.01)
    *F16H 37/02*     (2006.01)

(52) U.S. Cl.
    CPC .............. *B60K 23/08* (2013.01); *F16D 48/06* (2013.01); *F16H 63/48* (2013.01); *B60K 2023/0858* (2013.01); *B60Y 2300/18141* (2013.01); *B60Y 2400/72* (2013.01); *B60Y 2400/82* (2013.01); *F16D 2500/10412* (2013.01); *F16D 2500/10431* (2013.01); *F16D 2500/70404* (2013.01); *F16H 3/666* (2013.01); *F16H 9/18* (2013.01); *F16H 37/022* (2013.01); *F16H 37/065* (2013.01); *F16H 63/3425* (2013.01)

(56) References Cited

U.S. PATENT DOCUMENTS

| | | | |
|---|---|---|---|
| 2014/0155214 A1* | 6/2014 | Kimura | B60L 50/16 |
| | | | 475/160 |
| 2015/0266480 A1 | 9/2015 | Kuroki et al. | |
| 2017/0321767 A1* | 11/2017 | Khafagy | F16D 48/06 |
| 2018/0245525 A1* | 8/2018 | Koike | F02M 37/08 |

FOREIGN PATENT DOCUMENTS

| | | |
|---|---|---|
| JP | 2011-152818 A | 8/2011 |
| JP | 2016-020713 A | 2/2016 |
| JP | 2016-172516 A | 9/2016 |
| WO | WO 2014/068723 A1 | 5/2014 |

OTHER PUBLICATIONS

Japanese Office Action, dated May 7, 2019, in Japanese Patent Application No. 2016-247267 and English translation thereof.

* cited by examiner

CONTROL APPARATUS OF VEHICLE

CROSS-REFERENCE TO RELATED APPLICATIONS

The present application claims priority from Japanese Patent Application No. 2016-247267 filed on Dec. 20, 2016, the entire contents of which are hereby incorporated by reference.

BACKGROUND

The technology relates to a control apparatus of an all-wheel drive vehicle. In particular, the technology relates to a control apparatus of an all-wheel drive vehicle that is mounted with an automatic transmission having a parking mechanism that locks an output shaft.

Japanese Unexamined Patent Application Publication (JP-A) No. H09-152031 discloses a control apparatus of an automatic transmission that includes a locking device designed to mechanically stop rotation of an output shaft when a parking range is selected. The control apparatus includes a friction engagement member that comes into engagement with the output shaft to stop the rotation when the parking range is selected, and a device that gradually releases the engagement of the friction engagement member when shifting is performed from the parking range to any other range. According to the control apparatus of the automatic transmission disclosed in JP-A No. H09-152031, the friction engagement member is gradually released when the shifting is performed from the parking range to any other range and the locking device is released, preventing the output shaft from being released immediately. This in turn prevents abrupt rotation of the output shaft even when torsional torque is accumulated in a power transmission system including the output shaft, making it possible to prevent occurrence of shock, vibration, etc. attributed to the torsional torque.

SUMMARY

What is desired for a control apparatus of an all-wheel drive (AWD) vehicle, which is able to drive front wheels and rear wheels, i.e., able to drive all wheels, is to be able to increase operability of the all-wheel drive vehicle.

It is desirable to provide a control apparatus of an all-wheel drive vehicle which makes it possible to increase operability of the all-wheel drive vehicle.

An aspect of the technology provides a control apparatus of an all-wheel drive vehicle. The all-wheel drive vehicle is provided with a drive force source, a drive wheel, and an automatic transmission that includes an output shaft and a parking mechanism. The parking mechanism is provided with a parking gear and a parking pawl, and is able to lock the output shaft. The control apparatus controls the all-wheel drive vehicle. The control apparatus includes: a vehicle speed detector configured to detect a speed of the all-wheel drive vehicle; a first clutch that is provided between the parking mechanism and the drive force source, and is configured to adjust first drive force to be transmitted from the drive force source to the output shaft of the automatic transmission; a second clutch that is provided between the parking mechanism and the drive wheel, and is configured to adjust second drive force to be transmitted from the output shaft of the automatic transmission to the drive wheel; and a clutch controller configured to control engagement force of each of the first clutch and the second clutch, and disengages the first clutch and the second clutch when the speed of the all-wheel drive vehicle is equal to or less than a predetermined speed.

DETAILED DESCRIPTION

In the following, some implementations of the technology are described in detail with reference to the accompanying drawings. Note that elements in the drawings which are the same as or equivalent to each other are denoted with the same reference numerals to avoid any redundant description.

In general, drive force outputted from an engine is supplied to an automatic transmission through a torque converter. The drive force converted by the automatic transmission is transmitted to drive wheels through a power transmission system that includes members such as a gear and a drive shaft. In such a configuration, the member structuring the power transmission system, such as the drive shaft, involves generation of torsion attributed to engine torque applied through the torque converter, in a state where, for example, a shift position is in a drive (D) range or a reverse (R) range and where a brake pedal is pressed down and thus a vehicle is stopped.

Further, when a parking (P) range is selected for the shift position, the automatic transmission involves locking of a parking gear that is engaged with an output shaft of the automatic transmission. In other words, the output shaft is fixed when the parking range is selected. This means that a state of the torsion of the member structuring the power transmission system, such as the drive shaft, is maintained when the parking gear is locked in a state in which the drive shaft, or any other member structuring the power transmission system, involves the generation of the torsion as described above. Under such circumstances, when shifting is performed thereafter from the parking range to any other range such as the drive range and the reverse range, the locking of the parking gear is released and the state of the torsion maintained in the member of the power transmission system is released accordingly. Upon the releasing of the torsion, however, the parking gear, the drive shaft, or any other member may sometimes rotate due to torsional torque accumulated in the member of the power transmission system such as the drive shaft, thereby causing shock, vibration, or abnormal noise and thus raising a possibility of giving an occupant a sense of discomfort.

As described above, a technique disclosed in JP-A No. H09-152031 is able to prevent occurrence of shock, abnormal noise, etc., resulting from releasing of torsional torque accumulated as a torsional deformation in a power transmission system. However, another issue may possibly arise under circumstances where a parking gear is locked in a state in which a member structuring the power transmission system, such as a drive shaft, involves generation of torsion and thus a state of the torsion is maintained in the drive shaft or any other member structuring the power transmission system. Specifically, when performing shifting from a parking range to any other range such as a drive range and a reverse range under such circumstances, an engagement load (i.e., a load upon shifting from a parking range) applied to a part at which the parking gear and a parking pawl are in mesh engagement with each other becomes excessive. The excessive engagement load prevents the parking pawl from being released easily, thereby possibly raising an issue that a range shifting operation from the parking range becomes difficult.

Incidentally, a technique referred to as an automatic neutral control has been known that achieves an increase in fuel saving by shifting an automatic transmission into neutral even when a shift position is in a drive range, in a case where, for example, an accelerator is fully closed substantially and a brake pedal is pressed down and thus a vehicle is stopped. For example, reference is made to JP-A No. 2005-83492. When such an automatic neutral control is applied to an automatic transmission provided with a parking mechanism, such as that described above, a member such as an automatic neutral clutch is released and torsion of a member structuring a power transmission system, such as a drive shaft, is released accordingly after the stop of the vehicle and before a parking range is selected. In other words, automatic neutral clutch, for example, is released and the drive shaft, or any other member structuring the power transmission system, is released accordingly before a parking gear engaged with an output shaft of the automatic transmission is subjected to locking. Hence, the engagement load (i.e., the load upon shifting from the parking range) applied to the engagement part between the parking gear and a parking pawl is reduced.

However, in an all-wheel drive (AWD) vehicle that is able to drive front wheels and rear wheels, i.e., able to drive all wheels, a transfer clutch is not disengaged when the shift position is in the drive range even when the vehicle is stopped, for example. In this case, due to the non-disengagement of the transfer clutch, a drive shaft directed to the front wheels and a drive shaft directed to the rear wheels (including a propeller shaft) are maintained in a state in which those drive shafts are coupled to each other. This means that, even when the automatic neutral control is applied to the all-wheel drive vehicle, the torsion may sometimes not be released completely or substantially completely, in a situation where the drive shaft directed to the front wheels and the drive shaft directed to the rear wheels (including the propeller shaft) are stopped at their respective positions at which stiffness of a member such as the drive shaft directed to the front wheels and stiffness of a member such as the drive shaft directed to the rear wheels are balanced. Hence, there is a possibility, in the all-wheel drive vehicle, that the engagement load (i.e., the load upon shifting from the parking range) applied to the engagement part between the parking gear and the parking pawl may not be reduced sufficiently when the parking range is selected thereafter and the parking gear is thus locked.

At least one implementation of the technology therefore provides a control apparatus of an all-wheel drive vehicle, mounted with an automatic transmission having a parking mechanism that locks an output shaft, that is able to reduce a load required to operate a select lever (or a "shift lever"), i.e., a load upon shifting from a parking range, upon switching from the parking range to any other range such as a drive range and a reverse range.

Figure 1:
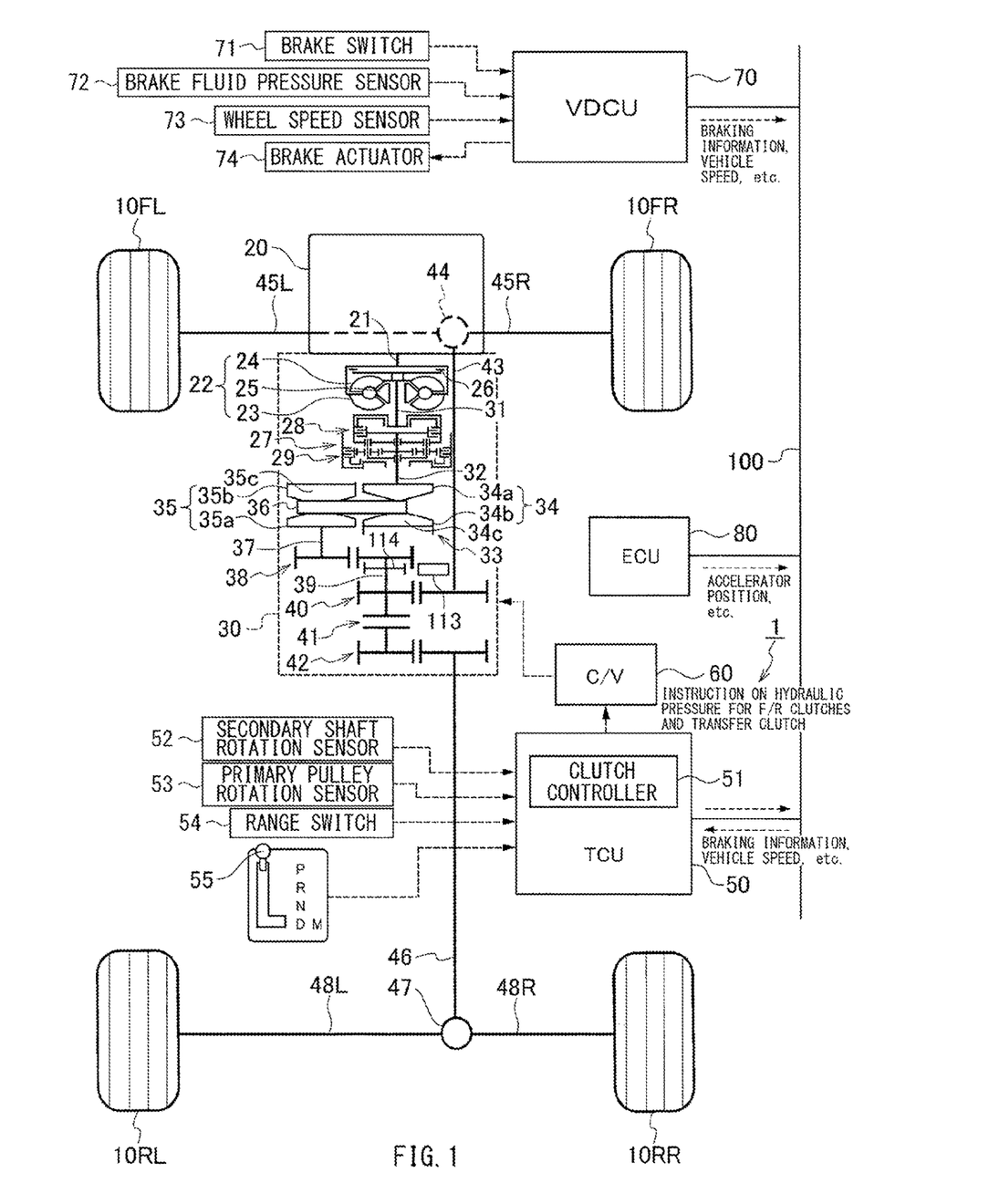
FIG. 1 is a block diagram illustrating an example of a configuration of a control apparatus of an all-wheel drive vehicle and an example of a configuration of a powertrain and a power transmission system of the all-wheel drive vehicle mounted with the control apparatus, according to one implementation.
Figure 2:
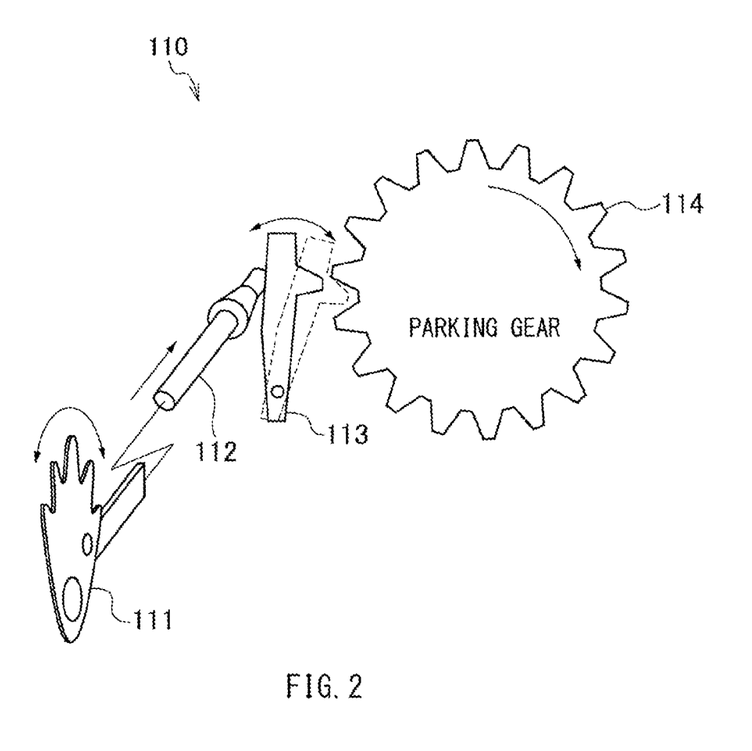
FIG. 2 illustrates an example of a configuration of a parking mechanism of a continuously-variable transmission.

A description is given first, with reference to FIGS. 1 and 2, of a configuration of a control apparatus 1 of an all-wheel drive vehicle (AWD) according to one implementation. FIG. 1 is a block diagram illustrating an example of a configuration of the control apparatus 1 of the all-wheel drive vehicle and an example of a configuration of a powertrain and a power transmission system of the all-wheel drive vehicle mounted with the control apparatus 1, according to one implementation. FIG. 2 illustrates an example of a configuration of a parking mechanism 110 of a continuously-variable transmission (CVT) 30.

Referring to FIG. 1, an engine 20 may be, for example but not limited to, a horizontal-opposed four cylinder gasoline engine. In one implementation, the engine 20 may serve as a "drive force source". The engine 20 may include an output shaft (or a "crankshaft") 21 that is coupled to the continuously-variable transmission 30. The continuously-variable transmission 30 may convert drive force that is derived from the engine 20 and transmitted through a torque converter 22 and a forward reverse switching mechanism 27, and output the converted drive force. The torque converter 22 may have both a clutch function and a torque amplifying function. In one implementation, the continuously-variable transmission 30 may serve as an "automatic transmission". Note that, in an alternative implementation, an electric motor or any other drive source may be used as the drive force source instead of the engine 20. In other words, any implementation of the technology may be applied to a hybrid electric vehicle (HEV), a plug-in hybrid electric vehicle (PHEV), an electric vehicle (EV), a fuel cell vehicle (FCV), or any other vehicle that uses the electric motor.

The torque converter 22 may include a pump impeller 23, a turbine runner 24, and a stator 25. The pump impeller 23 may be coupled to the output shaft 21, and generate a flow of oil. The turbine runner 24 may be so disposed as to face the pump impeller 23, and drive the output shaft 21 by receiving, through the oil, power of the engine 20. The stator 25 may be positioned between the pump impeller 23 and the turbine runner 24, and adjust a flow of the oil discharged (i.e., returned) from the turbine runner 24 to give the oil back to the pump impeller 23 and thereby generate a torque amplifying effect. The torque converter 22 may also include a lockup clutch 26 that allows input and output to be coupled to each other directly. The torque converter 22 may subject the drive force of the engine 20 to the torque amplification to transmit the drive force, having been subjected to the torque amplification, to the continuously-variable transmission 30 when the lockup clutch 26 is not locked up, and transmit the drive force of the engine 20 directly to the continuously-variable transmission 30 when the lockup clutch 26 is locked up.

The forward reverse switching mechanism 27 may switch between a normal rotation and a reverse rotation of drive wheels 10 including a front left wheel 10FL, a front right wheel 10FR, a rear left wheel 10RL, and a rear right wheel 10RR. In other words, the forward reverse switching mechanism 27 may switch between forward travel and reverse travel of the vehicle. The forward reverse switching mechanism 27 may include a double-pinion planetary gear train, a forward clutch 28, and a reverse brake 29. In one implementation, the reverse brake 29 may serve as a "reverse clutch". The forward reverse switching mechanism 27 may control a state of the forward clutch 28 and a state of the reverse brake 29 to allow for switching of a transmission passage of the drive force derived from the engine 20.

More specifically, the forward reverse switching mechanism 27 may engage the forward clutch 28 and disengage the reverse brake 29 when a drive (D) range is selected. Thus, a rotation of a turbine shaft 31 may be transferred as it is to a later-described primary shaft 32 to allow the vehicle to travel forward. When a reverse (R) range is selected, the forward reverse switching mechanism 27 may disengage the forward clutch 28 and engage the reverse brake 29. Thus, the planetary gear train may be operated and a direction of the rotation of the primary shaft 32 may be thereby reversed to allow the vehicle to travel backward.

When a neutral (N) range or a parking (P) range is selected, the forward reverse switching mechanism 27 may disengage both the forward clutch 28 and the reverse brake 29. Thus, the turbine shaft 31 and the primary shaft 32 may be detached from each other and the forward reverse switching mechanism 27 may be thereby placed into a neutral state in which the forward reverse switching mechanism 27 does not transfer the power to the primary shaft 32. Further, the forward clutch 28 and the reverse brake 29 bear a function of creating a pseudo neutral state, i.e., bear an automatic neutral function. In the automatic neutral function, the forward clutch 28 and the reverse brake 29 are disengaged to limit the drive force to be transmitted from the torque converter 22 to the continuously-variable transmission 30, on a condition that the drive range is selected and a predetermined driving condition is satisfied. In one implementation, the forward clutch 28 and the reverse brake 29 may serve as an "automatic neutral clutch" or a "first clutch". An operation of the forward clutch 28 and an operation of the reverse brake 29 may be controlled by a transmission control unit 50 and a valve body (or a "control valve") 60 that are to be described later in greater detail. The transmission control unit 50 may also be referred to as a "TCU" hereinafter.

The continuously-variable transmission 30 may include a transmission mechanism 33 that includes the primary shaft 32 and a secondary shaft 37. The primary shaft 32 may be designed to be coupled to the turbine shaft (i.e., an output shaft) 31 of the torque converter 22 through the forward reverse switching mechanism 27. The secondary shaft 37 may be disposed parallel to the primary shaft 32. The primary shaft 32 may have a primary pulley 34 that includes a fixed pulley 34a and a movable pulley 34b. The fixed pulley 34a may be coupled to the primary shaft 32. The movable pulley 34b may be so provided as to face the fixed pulley 34a, and so attached to the primary shaft 32 as to be slidable in an axial direction of the primary shaft 32. Thus, the primary pulley 34 may be so configured as to be able to vary a spacing between a cone surface of the fixed pulley 34a and a cone surface of the movable pulley 34b. In other words, the primary pulley 34 may be able to vary a pulley groove width. The secondary shaft 37 may have a secondary pulley 35 that includes a fixed pulley 35a and a movable pulley 35b. The fixed pulley 35a may be coupled to the secondary shaft 37. The movable pulley 35b may be so provided as to face the fixed pulley 35a, and so attached to the secondary shaft 37 as to be slidable in an axial direction of the secondary shaft 37. Thus, the secondary pulley 35 may be so configured as to be able to vary a pulley groove width.

A chain 36 may transfer the drive force, and may be so provided as to be wound around between the primary pulley 34 and the secondary pulley 35. A ratio between a winding diameter of the chain 36 with respect to the primary pulley 34 and a winding diameter of the chain 36 with respect to the secondary pulley 35, i.e., a pulley ratio, may be varied by varying a groove width of the primary pulley 34 and a groove width of the secondary pulley 35. Thus, varying the pulley ratio may continuously vary a transmission speed ratio.

The primary pulley 34, i.e., the movable pulley 34b, may have a hydraulic pressure chamber 34c. The secondary pulley 35, i.e., the movable pulley 35b, may have a hydraulic pressure chamber 35c. The groove width of the primary pulley 34 and the groove width of the secondary pulley 35 may be varied and set by adjusting a pressure applied to the oil to be introduced into the hydraulic pressure chamber 34c, i.e., a primary hydraulic pressure, of the primary pulley 34 and a pressure applied to the oil to be introduced into the hydraulic pressure chamber 35c, i.e., a secondary hydraulic pressure, of the secondary pulley 35.

The secondary shaft 37 of the transmission mechanism 33 may be coupled to a counter shaft 39 through a reduction gear 38. The reduction gear 38 may include a pair of gears including a reduction drive gear and a reduction driven gear. The drive force converted by the transmission mechanism 33 may be transmitted to the counter shaft 39 through the reduction gear 38. The counter shaft 39 may be attached with a parking gear 114. In one implementation, the counter shaft 39 may serve as an "output shaft".

A description is now given of the parking mechanism 110 of the continuously-variable transmission 30 with reference to FIG. 2. The parking mechanism 110 may lock the rotation inside the continuously-variable transmission 30 to prevent the drive wheels 10 from rotating, when the parking range is selected. The parking mechanism 110 may have a detent plate 111 that moves in conjunction with a later-described shift lever 55. The detent plate 111 may be coupled to a parking rod 112. The parking rod 112 may be so coupled to the detent plate 111 as to be movable back and forth in an axial direction. Further, the above-described parking gear 114 may be fitted to the counter shaft 39 of the continuously-variable transmission 30 through a spline. A parking pawl 113 may be so provided pivotably as to be in mesh engagement with the parking gear 114.

When the parking range is selected, the detent plate 111 may pivot in conjunction with a movement of the shift lever 55, i.e., in conjunction with an operation performed on the shift lever 55. By the pivot of the detent plate 111, the parking rod 112 may advance in the axial direction, and may thereby push the parking pawl 113 from a back surface of the parking pawl 113 by a tapered part of the parking rod 112. The parking pawl 113 may pivot by being pushed by the parking rod 112 and thereby come into mesh engagement with the parking gear 114. With this configuration, the counter shaft 39 of the continuously-variable transmission 30 may be locked.

Referring back to FIG. 1, the counter shaft 39 may be coupled to a front drive shaft 43 through a counter gear 40. The counter gear 40 may include a pair of gears including a counter drive gear and a counter driven gear. The drive force transmitted to the counter shaft 39 may be transmitted to a front differential 44 through the counter gear 40 and the front drive shaft 43. The front differential 44 may be, for example but not limited to, a bevel gear differential. The drive force derived from the front differential 44 may be transmitted to the front left wheel 10FL through a front left wheel drive shaft 45L, and transmitted to the front right wheel 10FR through a front right wheel drive shaft 45R.

A transfer clutch 41 may be provided downstream of the counter gear 40 (i.e., the counter drive gear) provided on the above-described counter shaft 39. The transfer clutch 41 may adjust the drive force to be transmitted to a rear differential 47. Engagement force of the transfer clutch 41 may be controlled on the basis of a factor such as drive states of the four drive wheels 10 and engine torque. In other words, a ratio of distribution of torque to be distributed to the rear left wheel 10RL and the rear right wheel 10RR, or a "torque distribution ratio", may be controlled. Non-limiting examples of the drive states of the four drive wheels 10 may include a state of slip of the front left wheel 10FL and the front right wheel 10FR. The drive force transmitted to the counter shaft 39 may be thus distributed in accordance with the engagement force of the transfer clutch 41, and the thus-distributed drive force may be transmitted to the rear left wheel 10RL and the rear right wheel 10RR. In one implementation, the transfer clutch 41 may serve as a "second clutch".

More specifically, a rear end of the counter shaft 39 may be coupled to a propeller shaft 46 through a transfer gear 42. The transfer gear 42 may include a pair of gears including a transfer drive gear and a transfer driven gear. The propeller shaft 46 may extend toward the rear of the vehicle. The drive force that is transmitted to the counter shaft 39 and adjusted (or distributed) by the transfer clutch 41 may be transmitted to the rear differential 47 through the propeller shaft 46 from the transfer gear 42, i.e., the transfer driven gear.

The rear differential 47 may be coupled to a rear left wheel drive shaft 48L and a rear right wheel drive shaft 48R. The drive force derived from the rear differential 47 may be transmitted to the rear left wheel 10RL through the rear left wheel drive shaft 48L, and transmitted to the rear right wheel 10RR through the rear right wheel drive shaft 48R.

The shift lever 55 may be provided on a floor of the vehicle, and may receive a shift operation performed by a driver of the vehicle. The shift lever 55 may be provided on a center console or any other location of the vehicle suitable for the shift operation. The shift lever 55 may be provided with a range switch 54. The range switch 54 may be so coupled to the shift lever 55 as to move in conjunction with the shift lever 55, and may detect a position selected by the shift lever 55. The range switch 54 may be coupled to the TCU 50 to allow the TCU 50 to read the detected selection position of the shift lever 55. For example, the shift lever 55 may allow for selective switching of five shift ranges including, without limitation, the P (Parking) range, the R (Reverse: reverse travel) range, the N (Neutral) range, the D (Drive: forward travel) range, and an M (Manual) range.

The power transmission system including the powertrain described above may cause the forward clutch 28 to be engaged and may thus cause the drive force of the engine 20 to be supplied to the primary shaft 32 of the continuously-variable transmission 30, when the shift lever 55 is so operated as to be in the drive range, for example. The drive force converted by the continuously-variable transmission 30 may be outputted from the secondary shaft 37. The drive force outputted from the secondary shaft 37 may be transmitted to the front drive shaft 43 through the reduction gear 38, the counter shaft 39, and the counter gear 40. The thus-transmitted drive force may be distributed to the right and the left by the front differential 44 to be transmitted to the front left wheel 10FL and the front right wheel 10FR. Hence, the front left wheel 10FL and the front right wheel 10FR may be driven constantly when the vehicle is in a traveling state.

A part of the drive force transmitted to the counter shaft 39 may be transmitted to the propeller shaft 46 through the transfer clutch 41 and the transfer gear 42. When predetermined clutch torque is applied to the transfer clutch 41, the drive force distributed in accordance with the clutch torque may be outputted to the propeller shaft 46. The drive force may be further transmitted to the rear left wheel 10RL and the rear right wheel 10RR through the rear differential 47.

The hydraulic pressure directed to a speed change of the continuously-variable transmission 30, i.e., the primary hydraulic pressure and the secondary hydraulic pressure that are described above, may be controlled by the valve body (or the control valve) 60. The valve body 60 may open and close an oil passage provided in the valve body 60 by means of a spool valve and a solenoid valve that actuates the spool valve. By opening and closing the oil passage, the valve body 60 may adjust a pressure of the oil discharged from an oil pump, and may supply the pressure-adjusted oil to the hydraulic pressure chamber 34c of the primary pulley 34 and the hydraulic pressure chamber 35c of the secondary pulley 35. Similarly, the valve body 60 may open and close an oil passage provided in the valve body 60 by means of a spool valve and a solenoid valve that actuates the spool valve, thereby adjusting a pressure of the oil discharged from the oil pump and supplying the pressure-adjusted oil to the clutches such as the forward clutch 28, the reverse brake 29, and the transfer clutch 41. By supplying the pressure-adjusted oil to the clutches, the valve body 60 may apply the hydraulic pressure directed to the engagement and the disengagement of each of the clutches.

The TCU 50 may perform a speed change control of the continuously-variable transmission 30. The TCU 50 may control driving of the solenoid valve that configures the valve body 60 described above. By controlling the driving of the solenoid valve, the TCU 50 may adjust the hydraulic pressure to be applied to the hydraulic pressure chamber 34c of the primary pulley 34 and the hydraulic pressure chamber 35c of the secondary pulley 35, and may thereby vary the transmission speed ratio of the continuously-variable transmission 30. Similarly, the TCU 50 may control driving of the solenoid valve that configures the valve body 60 described above, adjusting the hydraulic pressure to be applied to the members such as the forward clutch 28, the reverse brake 29, and the transfer clutch 41 and thereby controlling the engagement and the disengagement of the members such as the forward clutch 28, the reverse brake 29, and the transfer clutch 41. With this configuration, the TCU 50 may perform a control that switches between the forward travel and the reverse travel (i.e., a forward reverse switching control), the automatic neutral control, a drive force distribution control (an AWD control), and a control that reduces a load upon shifting from the parking range (i.e., a P-switching load reduction control). A description on the controls performed by the TCU 50 is given later in greater detail.

The TCU 50 may be so coupled to an engine control unit (ECU) 80, a vehicle dynamic control unit (VDCU) 70, etc., as to be able to communicate with each other through a controller area network (CAN) 100. The ECU 80 may control the engine 20 in a comprehensive fashion.

The VDCU 70 may be coupled to a brake switch 71 and a brake fluid pressure sensor 72. The brake switch 71 may detect whether a brake pedal is pressed down. The brake fluid pressure sensor 72 may detect a master cylinder pressure (i.e., a brake hydraulic pressure) of a brake actuator 74. In one implementation, the brake switch 71 and the brake fluid pressure sensor 72 may serve as a "brake operation detector". The VDCU 70 may also be coupled to a wheel speed sensor 73 that detects a rotation speed of each of the wheels of the vehicle, i.e., detects a vehicle speed. In one implementation, the wheel speed sensor 73 may serve as a "vehicle speed detector".

The VDCU 70 may drive the brake actuator 74 on the basis of an amount of operation performed on the brake pedal, i.e., on the basis of an amount of pressing down on the brake pedal, and may thereby perform braking of the vehicle. The VDCU 70 may also detect a behavior of the vehicle by various sensors, and may thereby restrain skidding and thus ensure stability of the vehicle upon turning by means of a torque control of the engine 20 and a brake control that involves automatic pressure application. Non-limiting examples of the various sensors may include the wheel speed sensor 73, a steering angle sensor, an acceleration sensor, and a yaw rate sensor.

The VDCU 70 may send, to the TCU 50 through the CAN 100, pieces of information such as information on the braking (i.e., brake operation information), a wheel speed (i.e., the vehicle speed), and an acceleration rate of the vehicle. Non-limiting examples of the information on the braking may include a result of the detection performed by the brake switch 71 and a brake fluid pressure.

The TCU 50 may be coupled to a secondary shaft rotation sensor 52 and a primary pulley rotation sensor 53. The secondary shaft rotation sensor 52 may be attached in the vicinity of the secondary shaft 37 of the continuously-variable transmission 30, and may detect the number of rotations of the secondary shaft 37. The secondary shaft rotation sensor 52 may also function as a vehicle speed sensor. The primary pulley rotation sensor 53 may detect the number of rotations of the primary pulley 34. The TCU 50 may be coupled to the range switch 54 that detects the position selected by the shift lever 55. Further, the TCU 50 may receive pieces of information through the CAN 100. Non-limiting examples of the pieces of information received by the TCU 50 may include: the information on the braking (i.e., the brake operation information) including the result of the detection performed by the brake switch 71 and the brake fluid pressure; the wheel speed (i.e., the vehicle speed); and the acceleration rate of the vehicle. Non-limiting examples of the pieces of information received by the TCU 50 may also include the revolutions per minute of the engine 20, a position of the accelerator pedal, and the engine torque that are sent from the ECU 80.

The TCU 50 may include devices such as a microprocessor, a read only memory (ROM), a random access memory (RAM), a backup RAM, and an input-output interface (I/F). The microprocessor may perform calculation. The ROM may store information such as a speed change map and a program that causes the microprocessor to execute various processes. The RAM may store various pieces of data such as a result of the calculation. The backup RAM may hold stored contents by means of a battery that may be at 12 volts.

The TCU 50 may continuously vary the transmission speed ratio automatically on the basis of the speed change map and in response to a driving state of the vehicle. Non-limiting examples of the driving state of the vehicle may include the accelerator pedal position, the vehicle speed, and the revolutions per minute of the engine 20. The speed change map may be stored in the ROM provided in the TCU 50.

The TCU 50 may control, in real time, the engagement force of the transfer clutch 41 (i.e., the torque distribution ratio of the rear left wheel 10RL and the rear right wheel 10RR) on the basis of various pieces of information. The various pieces of information may represent the driving state of the vehicle, and may be obtained from devices such as the various sensors described above. Non-limiting examples of the various pieces of information may include the drive states of the four drive wheels 10 and the engine torque. In other words, the TCU 50 may perform the drive force distribution control, i.e., the AWD control.

Further, the TCU 50 may disengage both the forward clutch 28 and the reverse brake 29 when a predetermined condition on the automatic neutral control is satisfied. In other words, the TCU 50 may perform the automatic neutral control. In one specific but non-limiting implementation, the TCU 50 may disengage the forward clutch 28 and the reverse brake 29 on a condition that: the brake switch 71 is ON (e.g., the brake pedal is pressed down); a value of the position of the accelerator is less than an accelerator position determining threshold (e.g., the accelerator pedal is released); a value of the vehicle speed is less than a vehicle-stop determining threshold (e.g., the vehicle is stopped); and the shift lever 55 is set to a traveling range (e.g., any range other than the parking range and the neutral range). In an alternative implementation, the TCU 50 may place the forward clutch 28 and the reverse brake 29 into a half-engaged state or a half-clutch state when the predetermined automatic neutral control condition is satisfied.

In particular, in one implementation, the TCU 50 has a function of so controlling the hydraulic pressure of the forward clutch 28, the reverse brake 29, and the transfer clutch 41 as to reduce a load that is required to operate the shift lever 55 upon switching (i.e., shifting) from the parking range to any other range such as the drive range and the reverse range. The load required to operate the shift lever 55 upon the switching may also be referred to as a "P-switching load" hereinafter. In other words, the TCU 50 has a P-switching load reduction function. To achieve the P-switching load reduction function, the TCU 50 has a clutch controller 51 functionally. The program stored in the ROM may be executed by the microprocessor to achieve a function as the clutch controller 51 in the TCU 50. In one implementation, the clutch controller 51 may serve as a "clutch controller".

In one implementation, the clutch controller 51 may disengage the forward clutch 28 and the reverse brake 29 and disengage the transfer clutch 41, in a case where the brake pedal is pressed down (i.e., the braking is currently performed) and the vehicle speed is equal to or less than a predetermined speed. The predetermined speed may be an extremely-low vehicle speed immediately before the stop of the vehicle, such as, but not limited to, 5 km/h. In an alternative implementation, the clutch controller 51 may disengage the forward clutch 28 and the reverse brake 29 and disengage the transfer clutch 41, in a case where the brake pedal is pressed down (i.e., the vehicle is braked) and the vehicle speed is zero (i.e., the vehicle is stopped). In a yet alternative implementation, the clutch controller 51 may disengage the forward clutch 28 and the reverse brake 29 and disengage the transfer clutch 41, after an elapse of a predetermined time period following satisfaction of the vehicle speed of zero. The predetermined time period may be, for example but not limited to, about seconds. Note that one or more conditions for the execution may be further added to any of the conditions described above, such as a condition where the accelerator pedal is released.

Figure 3:
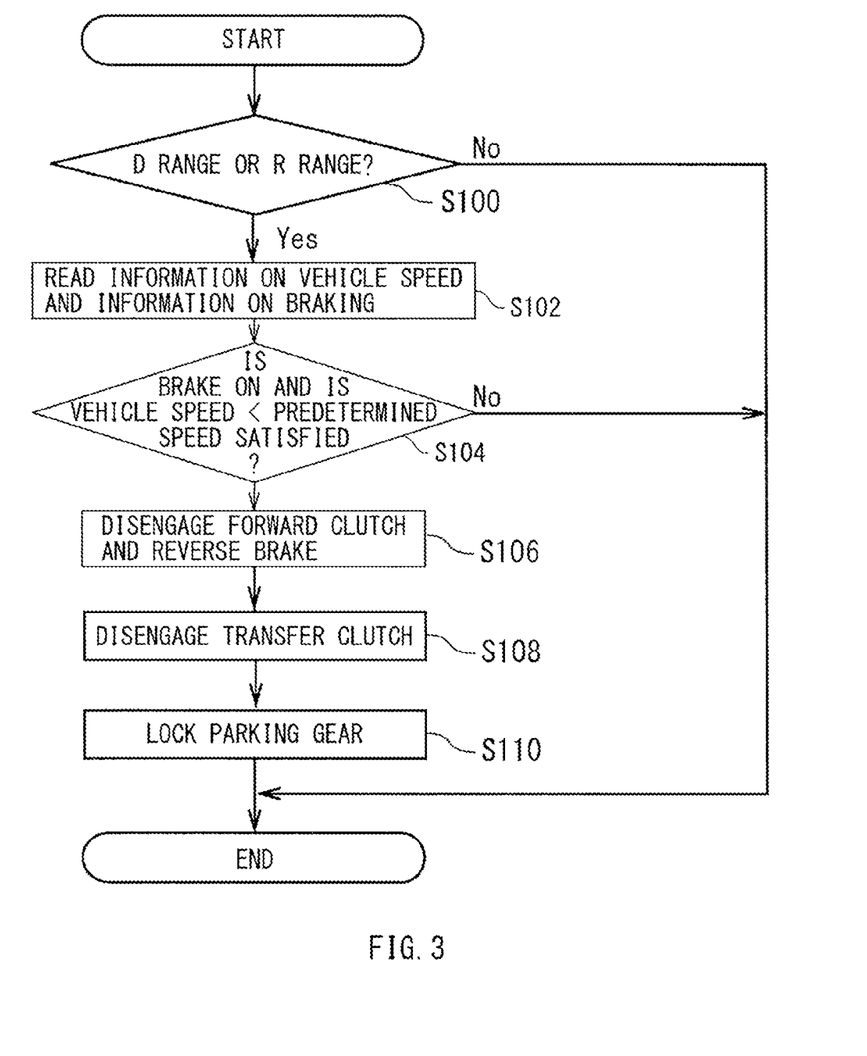
FIG. 3 is a flowchart illustrating an example of a process procedure for carrying out a control of reducing a load upon shifting from a parking range, performed by the control apparatus of the all-wheel drive vehicle according to one implementation.

A description is given next of an operation of the control apparatus 1 of the all-wheel drive vehicle with reference to FIG. 3. FIG. 3 is a flowchart illustrating an example of a process procedure for carrying out the P-switching load reduction control, performed by the control apparatus 1 of the all-wheel drive vehicle according to one implementation.

Basically, the process may be executed repeatedly by the TCU 50 at a predetermined timing.

In step S100, a determination may be made as to whether the shift range of the continuously-variable transmission 30 is the drive range or the reverse range. The process may proceed to step S102 when the determination is made that the shift range is the drive range or the reverse range (S100: Yes). The process may once end when the determination is made that the shift range is not the drive range or the reverse range, i.e., when the shift range is the parking range or the neutral range (S100: No).

In step S102, information such as information on the vehicle speed and information on the braking, e.g., information on the operation of the brake pedal, may be read. Thereafter, in step S104, a determination may be made as to whether the brake pedal is pressed down (i.e., the braking is currently performed) and the vehicle speed is equal to or less than a predetermined value. For example, a determination may be made as to whether the brake pedal is pressed down (i.e., the braking is currently performed) and the vehicle speed is the extremely-low vehicle speed immediately before the stop of the vehicle, or is the vehicle speed which is zero. The process may proceed to step S106 when the determination is made that both of such conditions are satisfied (S104: Yes). The process may once end when the determination is made that the one or both of such conditions are not satisfied (S104: No). In an alternative implementation, in step S104, the process may proceed to step S106 when the predetermined time period has elapsed after the stop of the vehicle.

In step S106, the forward clutch 28 and the reverse brake 29 may be disengaged. Thereafter, in step S108, the transfer clutch 41 may be disengaged. Hence, in one implementation, it is possible to release all of the following torsions, namely: torsion of a member structuring the power transmission system between the engine 20 and the parking mechanism 110, i.e., the power transmission system upstream of the parking mechanism 110, such as one or more of the drive shafts including the crank shaft 21, the turbine shaft 31, the primary shaft 32, the secondary shaft 37, and the counter shaft 39; torsion of a member structuring the power transmission system between the parking mechanism 110 and each of the front left wheel 10FL and the front right wheel 10FR, i.e., the power transmission system downstream of the parking mechanism 110, such as one or more of the drive shafts including the front drive shaft 43, the front left wheel drive shaft 45L, and the front right wheel drive shaft 45R; and torsion of a member structuring the power transmission system between the parking mechanism 110 and each of the rear left wheel 10RL and the rear right wheel 10RR, i.e., the power transmission system downstream of the parking mechanism 110, such as one or more of the drive shafts including the propeller shaft 46, the rear left wheel drive shaft 48L, and the rear right wheel drive shaft 48R.

Thereafter, in step S110, the parking gear 114 and the parking pawl 113 may be fitted to each other to lock the parking gear 114 when the parking range is selected.

According to one implementation as described above in detail, the forward clutch 28 and the reverse brake 29 are disengaged and the transfer clutch 41 is disengaged, in a case where the brake pedal is pressed down (i.e., the braking is currently performed) and the vehicle speed is equal to or less than the predetermined speed. Thus, the torsion between the parking mechanism 110 and the engine 20, i.e., torsion generated upstream of the parking mechanism 110 and the torsion between the parking mechanism 110 and the drive wheels 10, i.e., the torsion generated downstream of the parking mechanism 110, are released. In other words, the torsion upstream of the parking mechanism 110 and the torsion downstream of the parking mechanism 110 are both released and the load applied to a gear tooth surface of the parking gear 114 is reduced by the time the parking range is selected later and thus the parking gear is locked. Hence, it is possible to reduce the load, i.e., the P-switching load, required to operate the shift lever 55 upon switching from the parking range to any other range.

In an alternative implementation, the forward clutch 28, the reverse brake 29, and the transfer clutch 41 may be disengaged in a case where the vehicle speed is zero, i.e., when the vehicle is stopped. In such an alternative implementation, the forward clutch 28, the reverse brake 29, and the transfer clutch 41 are not disengaged before the stop of the vehicle even after the vehicle decelerates, i.e., even when the vehicle decelerates to the speed equal to or less than the predetermined speed. Hence, even when a request for re-acceleration of the vehicle is made after the deceleration (i.e., before the stop of the vehicle), it is possible to prevent deterioration in performance upon the re-acceleration resulting from a delay in engagement of the forward clutch 28, the reverse brake 29, and the transfer clutch 41.

In a yet alternative implementation, the forward clutch 28, the reverse brake 29, and the transfer clutch 41 may be disengaged after the predetermined time period, or a delay time, has elapsed from the satisfaction of the vehicle speed of zero. In such an alternative implementation, the forward clutch 28, the reverse brake 29, and the transfer clutch 41 are not disengaged before the complete stop of the vehicle even after the vehicle decelerates, i.e., even when the vehicle decelerates to the speed equal to or less than the predetermined speed. Hence, even when a request for restart of the vehicle is made immediately after the stop of the vehicle, it is possible to further ensure that the deterioration in performance upon the restart, resulting from the delay in engagement of the forward clutch 28, the reverse brake 29, and the transfer clutch 41, is prevented.

In one implementation, the forward clutch 28, the reverse brake 29, and the transfer clutch 41 are used to reduce the P-switching load. In other words, the forward clutch 28, the reverse brake 29, and the transfer clutch 41 serve both as a clutch function and a P-switching load reducing function. Thus, it is possible to reduce the P-switching load without newly adding a dedicated mechanism or a dedicated component. Hence, it is possible to reduce the P-switching load while restraining an increase in, for example, costs, weight, etc.

Although some implementations of the technology have been described in the foregoing, the technology is by no means limited to the implementations described above and is variously modifiable. For example, in an alternative implementation, presence of a possibility that the request for re-acceleration of the vehicle is made after the deceleration (or the request for restart of the vehicle after the stop) may be estimated. In a case where the possibility that the request for re-acceleration of the vehicle (or the request for restart of the vehicle) is made is high, the disengagement of the forward clutch 28, the reverse brake 29, and the transfer clutch 41 may be prohibited even when the vehicle speed becomes equal to or less than the predetermined speed, including zero, by the braking (e.g., the braking operation). In one specific but non-limiting implementation, the TCU 50 may first acquire an index value directed to the estimation of the presence of the possibility that the request for re-acceleration of the vehicle (or the request for restart of the vehicle) is made. Non-limiting examples of the index value may include: information on the operation of the accelerator pedal; information on the operation of the brake pedal; information on steering of the steering wheel; the acceleration rate of the vehicle, i.e., information on acceleration and deceleration; information on external environment, such as information on an image ahead of a camera; and information on car navigation, such as pieces of information on a road, a signal, and a parking lot. In one implementation, the TCU 50 may serve as an "index value obtaining unit".

Further, in one specific but non-limiting implementation, the TCU 50 (or the clutch controller 51 in one implementation) may estimate the presence of the possibility that the request for re-acceleration of the vehicle (or the request for restart of the vehicle) is made on the basis of the acquired index value. In a case where a result of the estimation represents that there is the possibility of making of the request for re-acceleration of the vehicle (or the request for restart of the vehicle), the TCU 50 (or the clutch controller 51 in one implementation) may prohibit the disengagement of the forward clutch 28, the reverse brake 29, and the transfer clutch 41 even when the brake pedal is pressed down (i.e., the braking is currently performed) and the vehicle speed is equal to or less than the predetermined speed including zero.

In such an alternative implementation, the presence of the possibility that the request for re-acceleration of the vehicle (or the request for restart of the vehicle) is made may be estimated on the basis of the acquired index value. Further, in such an alternative implementation, the disengagement of the forward clutch 28, the reverse brake 29, and the transfer clutch 41 may be prohibited even when the brake pedal is pressed down (i.e., the braking is currently performed) and the vehicle speed is equal to or less than the predetermined speed including zero, in a case where the result of the estimation represents that there is the possibility of making of the request for re-acceleration of the vehicle (or the request for restart of the vehicle). Hence, it is possible to more appropriately prevent the deterioration in performance upon the re-acceleration (or performance upon the restart) resulting from the delay in engagement of the forward clutch 28, the reverse brake 29, and the transfer clutch 41, by taking into consideration the possibility that the request for re-acceleration of the vehicle (or the request for restart of the vehicle) is made. In contrast, in a case where the result of the estimation represents that there is no possibility of making of the request for re-acceleration of the vehicle (or the request for restart of the vehicle), or that the possibility is low alternatively, the forward clutch 28, the reverse brake 29, and the transfer clutch 41 may be disengaged when the vehicle speed is equal to or less than the predetermined speed including zero, allowing for complete release, or substantially-complete release, of the torsion of the member such as the drive shaft before the vehicle stops or upon the stop of the vehicle. Hence, it is possible to ensure that the load, i.e., the P-switching load, required to operate the shift lever 55 upon switching from the parking range to any other range (such as the drive range and the reverse range) is reduced even when, for example, the shifting is performed to the parking range substantially at the same time as the stop of the vehicle. As a result, it is possible to further ensure that the P-switching load is reduced while ensuring the performance upon the re-acceleration (or the performance upon the restart).

In one implementation described above, the continuously-variable transmission 30 may be a chain continuously-variable transmission (CVT). However, instead of the chain continuously-variable transmission, any implementation of the technology may be applied to a belt continuously-variable transmission, a toroidal continuously-variable transmission, or a continuously-variable transmission of any other type. Any implementation of the technology may also be applied to a stepped automatic transmission, a dual-clutch transmission (DCT), or any other transmission to which any implementation of the technology is applicable, instead of the continuously-variable transmission.

In one implementation described above, the forward clutch 28, the reverse brake 29, and the transfer clutch 41 each may be of an hydraulic pressure type. In an alternative implementation, a solenoid clutch may be used for one or more of the forward clutch 28, the reverse brake 29, and the transfer clutch 41. Further, in an alternative implementation, a timing at which the forward clutch 28 and the reverse brake 29 are disengaged and a timing at which the transfer clutch 41 is disengaged do not necessarily have to be the same.

The configuration of the power transmission system described above, such as arrangement of gears, shafts, etc., is an illustrative and non-limiting. For example, in an alternative implementation, the forward reverse switching mechanism 27 (e.g., the forward clutch 28 and the reverse brake 29) may be disposed downstream of the continuously-variable transmission (such as the secondary pulley 35).

In one implementation described above, the TCU 50, the VDCU 70, and the ECU 80 may be so coupled to each other as to be able to communicate mutually through the CAN 100. A system configuration, however, is not limited to that described above, and may be variously modified on an as-needed basis in consideration of a factor such as a functional requirement and costs. For example, the transfer clutch 41 may be controlled by the TCU 50 in one implementation described above. In an alternative implementation, however, the transfer clutch 41 may be controlled by a dedicated AWD controller that is independent from the TCU 50.

A description has been given of one implementation where the continuously-variable transmission 30 may be a wire-based continuously-variable transmission. However, the continuously-variable transmission 30 may utilize a shift-by-wire (SBW). In such an alternative implementation, the parking gear 114 may be locked after the forward clutch 28, the reverse brake 29, and the transfer clutch 41 are disengaged.

A description has been given of one implementation by referring to a non-limiting example in which the vehicle decelerates (or stops) in the drive range. It is, however, possible to reduce the P-switching load when the vehicle decelerates (or stops) in the reverse range as well, by likewise controlling the forward clutch 28, the reverse brake 29, and the transfer clutch 41.

The TCU 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the TCU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the TCU 50 illustrated in FIG. 1.

According to one implementation described above, it is possible to increase operability of the all-wheel drive vehicle.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of a vehicle, the vehicle being provided with a drive force source, a drive wheel, an automatic transmission that includes an output shaft and a parking mechanism, and a transmission passage transmitting a force that the drive force source is generating toward the drive wheel, the parking mechanism being provided with a parking gear and a parking pawl and being able to lock the output shaft, the control apparatus controlling the vehicle, the control apparatus comprising:
 a vehicle speed detector configured to detect a speed of the vehicle;
 a brake operation detector configured to detect a state of operation of a brake configured to perform braking of the vehicle:
 a first clutch that is provided between the parking mechanism and the drive force source, and is configured to adjust a first drive force to be transmitted from the drive force source to the output shaft of the automatic transmission;
 a second clutch that is provided between the parking mechanism and the drive wheel, and is configured to adjust a second drive force to be transmitted from the output shaft of the automatic transmission to the drive wheel; and
 a clutch controller configured to control an engagement force of each of the first clutch and the second clutch, wherein the clutch controller is configured to:
  engage the first clutch and second clutch, when causing the vehicle to travel with the force that the drive force source is generating, the first clutch and the second clutch being in engaged states to apply the force that the drive force source is generating to the transmission passage;
  determine that conditions are met, the conditions including:
   the speed of the vehicle being equal to or less than a predetermined speed; and
   the operation of the brake of the vehicle performing the braking of the vehicle:
  disengage the first clutch and the second clutch to switch from the engaged states to disengaged states, responsive for determining that the conditions are met while the force that the drive force is generating is transmitted to the transmission passage.

2. The control apparatus of the vehicle according to claim 1,
 wherein the clutch controller disengages the first clutch and the second clutch when the brake is operated and the speed of the vehicle is equal to or less than the predetermined speed.

3. The control apparatus of the vehicle according to claim 2, wherein the clutch controller disengages the first clutch and the second clutch when the speed of the vehicle is zero.

4. The control apparatus of the vehicle according to claim 3, wherein the clutch controller disengages the first clutch and the second clutch after an elapse of a predetermined time period from satisfaction of the speed of the vehicle of zero.

5. The control apparatus of the vehicle according to claim 4, wherein the vehicle includes a front wheel and a rear wheel, one of the front wheel and the rear wheel including the drive wheel,
 wherein the first clutch comprises an automatic neutral clutch configured to be disengaged when a predetermined condition on an automatic neutral control is satisfied, and
 wherein the second clutch comprises a transfer clutch configured to adjust, on a basis of a driving state of the vehicle, the second drive force to be transmitted from the output shaft of the automatic transmission to one of the rear wheel and the front wheel as the drive wheel.

6. The control apparatus of the vehicle according to claim 5, wherein the automatic transmission comprises a continuously-variable transmission configured to continuously vary a transmission speed ratio,
 wherein the automatic neutral clutch comprises a forward reverse switching mechanism configured to switch a traveling direction of the vehicle, and
 wherein the forward reverse switching mechanism includes one or both of a forward clutch and a reverse clutch.

7. The control apparatus of the vehicle according to claim 3, wherein the vehicle includes a front wheel and a rear wheel, one of the front wheel and the rear wheel including the drive wheel,
 wherein the first clutch comprises an automatic neutral clutch configured to be disengaged when a predetermined condition on an automatic neutral control is satisfied, and
 wherein the second clutch comprises a transfer clutch configured to adjust, on a basis of a driving state of the vehicle, the second drive force to be transmitted from the output shaft of the automatic transmission to one of the rear wheel and the front wheel as the drive wheel.

8. The control apparatus of the vehicle according to claim 7, wherein the automatic transmission comprises a continuously-variable transmission configured to continuously vary a transmission speed ratio,
 wherein the automatic neutral clutch comprises a forward reverse switching mechanism configured to switch a traveling direction of the vehicle, and
 wherein the forward reverse switching mechanism includes one or both of a forward clutch and a reverse clutch.

9. The control apparatus of the vehicle according to claim 2, further comprising an index value obtaining unit configured to obtain an index value, the index value being directed to estimation of presence of a possibility that, after deceleration of the vehicle, one of a request for re-acceleration and a request for restart of the vehicle is made,
 wherein the clutch controller refrains from disengaging the first clutch and the second clutch when the clutch controller estimates, on a basis of the index value obtained by the index value obtaining unit, that there is the possibility of making of one of the request for re-acceleration and the request for restart.

10. The control apparatus of the vehicle according to claim 2, wherein the vehicle includes a front wheel and a rear wheel, one of the front wheel and the rear wheel including the drive wheel,
wherein the first clutch comprises an automatic neutral clutch configured to be disengaged when a predetermined condition on an automatic neutral control is satisfied, and
wherein the second clutch comprises a transfer clutch configured to adjust, on a basis of a driving state of the vehicle, the second drive force to be transmitted from the output shaft of the automatic transmission to one of the rear wheel and the front wheel as the drive wheel.

11. The control apparatus of the vehicle according to claim 10, wherein the automatic transmission comprises a continuously-variable transmission configured to continuously vary a transmission speed ratio,
wherein the automatic neutral clutch comprises a forward reverse switching mechanism configured to switch a traveling direction of the vehicle, and
wherein the forward reverse switching mechanism includes one or both of a forward clutch and a reverse clutch.

12. The control apparatus of the vehicle according to claim 1, wherein the clutch controller disengages the first clutch and the second clutch when the speed of the vehicle is zero.

13. The control apparatus of the vehicle according to claim 12, wherein the clutch controller disengages the first clutch and the second clutch after an elapse of a predetermined time period from satisfaction of the speed of the vehicle of zero.

14. The control apparatus of the vehicle according to claim 13, wherein the vehicle includes a front wheel and a rear wheel, one of the front wheel and the rear wheel including the drive wheel,
wherein the first clutch comprises an automatic neutral clutch configured to be disengaged when a predetermined condition on an automatic neutral control is satisfied, and
wherein, the second clutch comprises a transfer clutch configured to adjust, on a basis of a driving state of the vehicle, the second drive force to be transmitted from the output shaft of the automatic transmission to one of the rear wheel and the front wheel as the drive wheel.

15. The control apparatus of the vehicle according to claim 14, wherein the automatic transmission comprises a continuously-variable transmission configured to continuously vary a transmission speed ratio,
wherein the automatic neutral clutch comprises a forward reverse switching mechanism configured to switch a traveling direction of the vehicle, and
wherein the forward reverse switching mechanism includes one or both of a forward clutch and a reverse clutch.

16. The control apparatus of the vehicle according to claim 12, wherein the vehicle includes a front wheel and a rear wheel, one of the front wheel and the rear wheel including the drive wheel,
wherein the first clutch comprises an automatic neutral clutch configured to be disengaged when a predetermined condition on an automatic neutral control is satisfied, and
wherein the second clutch comprises a transfer clutch configured to adjust, on a basis of a driving state of the vehicle, the second drive force to be transmitted from the output shaft of the automatic transmission to one of the rear wheel and the front wheel as the drive wheel.

17. The control apparatus of the vehicle according to claim 16, wherein the automatic transmission comprises a continuously-variable transmission configured to continuously vary a transmission speed ratio,
wherein the automatic neutral clutch comprises a forward reverse switching mechanism configured to switch a traveling direction of the vehicle, and
wherein the forward reverse switching mechanism includes one or both of a forward clutch and a reverse clutch.

18. The control apparatus of the vehicle according to claim 1, further comprising an index value obtaining unit configured to obtain an index value, the index value being directed to estimation of presence of a possibility that, after deceleration of the vehicle, one of a request for re-acceleration and a request for restart of the vehicle is made,
wherein the clutch controller refrains from disengaging the first clutch and the second clutch when the clutch controller estimates, on a basis of the index value obtained by the index value obtaining unit, that there is the possibility of making of one of the request for re-acceleration and the request for restart.

19. The control apparatus of the vehicle according to claim 1, wherein the vehicle includes a front wheel and a rear wheel, one of the front wheel and the rear wheel including the drive wheel,
wherein the first clutch comprises an automatic neutral clutch configured to be disengaged when a predetermined condition on an automatic neutral control is satisfied, and
wherein the second clutch comprises a transfer clutch configured to adjust, on a basis of a driving state of the vehicle, the second drive force to be transmitted from the output shaft of the automatic transmission to one of the rear wheel and the front wheel as the drive wheel.

20. The control apparatus of the vehicle according to claim 19, wherein the automatic transmission comprises a continuously-variable transmission configured to continuously vary a transmission speed ratio,
wherein the automatic neutral clutch comprises a forward reverse switching mechanism configured to switch a traveling direction of the vehicle, and
wherein the forward reverse switching mechanism includes one or both of a forward clutch and a reverse clutch.

* * * * *